(12) United States Patent
Harrold

(10) Patent No.: US 6,186,367 B1
(45) Date of Patent: Feb. 13, 2001

(54) METERED LIQUID SQUEEZE DISPENSER

(75) Inventor: John E. Harrold, Hunterdon, NJ (US)

(73) Assignee: Valley Design Inc., Bloomsbury, NJ (US)

( * ) Notice: Under 35 U.S.C. 154(b), the term of this patent shall be extended for 0 days.

(21) Appl. No.: 09/420,674

(22) Filed: Oct. 19, 1999

(51) Int. Cl.$^7$ ........................................................ B67D 5/06
(52) U.S. Cl. .................. 222/205; 222/211; 222/438; 222/442; 222/481.5
(58) Field of Search ................................. 222/205, 207, 222/211, 212, 434, 438, 442, 481.5

(56) References Cited

U.S. PATENT DOCUMENTS

| | | | |
|---|---|---|---|
| 2,593,591 | 4/1952 | Menkin et al. | 222/205 |
| 2,774,517 | 12/1956 | Teegardin et al. | 222/205 |
| 3,628,700 | 12/1971 | Dodoghue | 222/207 |
| 4,077,547 | 3/1978 | Donoghue | 222/207 |
| 4,143,794 | 3/1979 | Stratford et al. | 222/42 |
| 4,157,768 | * 6/1979 | Britt | 222/205 |
| 4,420,100 | 12/1983 | Mueller | 222/205 |
| 4,747,521 | 5/1988 | Saffron | 222/205 |
| 4,757,922 | 7/1988 | Landecker | 222/205 |
| 4,875,603 | 10/1989 | Weinstein | 222/205 |
| 4,941,598 | 7/1990 | Lamblet, Jr. et al. | 222/321 |
| 5,014,881 | 5/1991 | Andris | 222/207 |
| 5,058,778 | 10/1991 | Weinstein | 222/209 |
| 5,110,051 | 5/1992 | Bennett | 239/327 |
| 5,127,553 | 7/1992 | Weinstein | 222/158 |
| 5,330,081 | 7/1994 | Davenport | 222/207 |
| 5,588,563 | 12/1996 | Liu | 222/158 |
| 5,772,086 | * 6/1998 | Krafft | 222/438 |
| 5,884,816 | * 3/1999 | Hinze | 222/311 |

FOREIGN PATENT DOCUMENTS

| | | | |
|---|---|---|---|
| 302793 | * 9/1922 | (IT) | 222/442 |
| 544136 | * 9/1922 | (FR) | 222/434 |

* cited by examiner

Primary Examiner—Joseph A. Kaufman
(74) Attorney, Agent, or Firm—Kenneth P. Glynn

(57) ABSTRACT

The present invention is a metered liquid squeezable dispenser, which includes a squeezable container having an open end and neck for dispensing liquid. A trap chamber base non-rotatably attached to the container and a trap chamber is rotatably attached to the trap chamber base. A dip tube is located in the base and extends into the container. There is an air inlet orifice located on the base. The trap chamber has a dispensing outlet, at least one metered dosage inlet pipe passing through the bottom of the trap chamber, extending upwardly therefrom for a predetermined height, and an air pipe passing through its bottom. The base and trap chamber align with one another for squeeze, metered dose filling, and then rotational realignment for squeeze dispensing.

20 Claims, 3 Drawing Sheets

METERED LIQUID SQUEEZE DISPENSER

BACKGROUND OF THE INVENTION

1. Field of the Invention

The present invention involves a metered liquid squeeze dispenser which provides for fixed dosage dispensing from a squeeze bottle in which rotating and squeezing sequences permit selected, repeated dosage dispensing.

2. Information Disclosure Statement

The following prior art is representative of dispenser containers:

U.S. Pat. No. 2,593,591 to Benjamin David Menkin, et al. and Frank M. Darling, describes in a fluid dispenser comprising a container, cylinder means removably mounted upon said container and depending thereinto, piston means mounted for reciprocation within and normally projecting yieldably upwardly beyond said cylinder means and including axially spaced abutments, said cylinder and piston means defining a continuous communicating fluid passage therethrough, valve means in said cylinder means and said piston means, the latter means being effective to pump a fluid upwardly from said container through said passage, and an axially ported cup disposed at the upper end of said piston means in a position to receive a flow from said passage: a wall of the cylinder being formed with radial holes in axially spaced relationship, a spring clamp clampable around the cylinder and including an end adapted to e carried in any selected hole for engagement with said abutments to adjust the extent of relative reciprocating movement of the piston means within the cylinder means.

U.S. Pat. No. 2,774,517 to James E. Teegardin and Benjamin David Menkin, describes a fluid dispensing device comprising a cylinder, an internal projection means in the wall of the cylinder, a resilient piston operatively mounted in the cylinder, a resilient external projection means associated with the piston for limiting its stroke in the cylinder, the resiliency of the piston and the external projection means being adapted for snapping them past the internal projection means into the cylinder, a valve mounted in the wall of the cylinder for valving fluid thereinto, a second valve for valving fluid out of the cylinder, and a spring means for urging the piston through a return stroke.

U.S. Pat. No. 3,628,700 to Robert J. Dodoghue, describes a container and closure assembly has a resilient lower storage chamber and a transparent upper dispensing chamber defined either in one unitary body, or in two units which are releasably secured to one another. A transfer tube in a fitment between the chambers serves to transfer a predetermined quantity of liquid from the lower to the upper chamber upon squeezing the lower one. The upper portion of the dispensing and measuring chamber has discharge orifices defined therein, or in an insert provided in a top opening thereof. The insert may comprise either an orifice pattern, an atomizing spray nozzle, or a foam nozzle and may be capped off by a conventional cap.

U.S. Pat. No. 4,077,547 to Robert J. Donoghue, describes a measuring and dispensing apparatus for use with a flexible-wall container is provided by the combination of a dispensing means having an enlarged cylindrical base portion and an upstanding portion, the upstanding portion having an upper end and a lower end, the lower end disposed on the enlarged base portion, the upstanding portion also having a bore therein and an outlet orifice disposed therein proximate the upper end and in fluid communication with the bore; the enlarged based portion having container engaging means thereon; wall means disposed around the dispensing means and forming, with he enlarged base portion a fluid measuring chamber, the chamber having an upper end having a fluid outlet; and a tube having an inlet end and an outlet end, the tube disposed so that the outlet end is disposed in the bore in the upstanding portion of the dispensing means and in fluid communication therewith, the inlet end adapted to be disposed in the flexible-wall container.

U.S. Pat. No. 4,143,794 to Michael G. Stratford and Ronald H. D. F. Lee, describes a dosing device for fluid which comprises a dip tube extension situated within a dosage cup, the extension being constructed to enable fluid to pass from within said extension into the dosage cup and a dosage determining sleeve slidably engaging a side wall of the extension and movable relative to the extension between positions enabling retention within said cup of a selected dosage volume of fluid and return of any excess fluid into said extension.

U.S. Pat. No. 4,420,100 to John J. Mueller, describes dispensing apparatus for a flexible container, including a closure for the container and an expansible bladder associated with the closure and adapted to fit within the container to expand and displace the dispensed contents. The closure has two openings, one at which it is attached to the container and the other forming an outlet for dispensing. A conduit extends from the bladder into the closure and communicates to the exterior of the closure and container through one of the two openings. The outlet opening is constructed to allow the contents to flow only in a direction from the container during use and a check valve allows flow through the conduit only into the bladder.

U.S. Pat. No. 4,747,521 to Ronald G. Saffron, describes a dosage device for the delivery of a measured quantity of a liquid or flowable paste, such as a medicament, comprises a cup component and a compartmented component which is secured within the cup component and rotatable with respect thereto about an axis, the cup component having a radial base wall with an opening radially offset from the axis, the compartmented component having axially extending walls bounding a plurality of compartments each of which has an open end and each of which can be brought, by relative rotation of the two components, into alignment with the base wall opening, each compartment having in its outer wall an outlet which is at a respective different axial spacing from its open end, the cup component and that outer wall bounding a dispensing space to receive liquid or flowable paste from the compartment.

U.S. Pat. No. 4,757,922 to David J. Landecker, describes a dispenser for liquid acrylic resin and powder, the dispenser having a dish, a raised inlet above the dish, and a shield for the inlet. A bottle or the like is mounted in coaxial relation therewith for dispensing fresh quantities of liquid from the reservoir bottle to the dispenser dish. The outlet in the dispenser dish is above the level of the liquid contained in the dish to prevent return of the liquid and has an umbrella-like shield over the inlet to prevent the backflow to prevent contaminated resin from returning to the bottle.

U.S. Pat. No. 4,875,603 to Jack Weinstein, describes the present invention is directed to a metered dispensing cap system for containers such as tubes and the like. The system has a base element which is attachable to the neck of a squeezable container and which has a sidewall portion and a top. The base element has an opening in the top for outflow of a material from a squeezable container into a meter element. This base element may be removably attachable, e.g. by being screwed on, or may be permanently attached, e.g. by being integrally molded with the container. A one way valve is located in the opening of the base element to permit the flow of material from a container through the opening while preventing backflow. The system also includes a meter element which acts like an inverted trap and which has a sidewall portion and a top with an opening in the top for dispensing of the material therefrom. The sidewall portion of the meter element is slightly larger than and has the same across section shape as the sidewall portion of the base element and this sidewall portion of the meter element is higher than and located about and encompasses the sidewall portion of the base element. Further, the meter element is vertically slidable along the sidewall portion of the base element with an upward position for receiving a volume of material in a pre-determined amount when the squeezable container is squeezed and downward position whereby the opening in the top of the meter element allows for dispensing of the desired amount of fluid when the meter element is pushed down.

U.S. Pat. No. 4,941,598 to Lawrence E. Lambelet, Jr. et al. and Thomas A. Frazier, describes apparatus for dispensing predetermined amounts of viscous product. The apparatus has a conduit which is telescopically received with a cap. The cap and conduit define an expandable dosing chamber which expands to a predetermined maximum volume when product is introduced into the chamber through the conduit. A check valve prevents back flow of product through the conduit. Collapsing the chamber from its maximum volume to a minimum volume dispenses the product from the dosing chamber.

U.S. Pat. No. 5,014,881 to Raimund Andris, describes in order to create a metering and spray pump of high functional reliability, consisting of as few individual parts as possible and able to be produced with as low production costs, in particular assembly costs, as possible, in which the pumping member consists of an elastically-flexible bellows, which is arranged connectively between mutually movable, dimensionally stable housing parts, the bellows has at its one end, as axial extension, a radially flexible, sleeve-like annular wall section, which encloses in sealing manner like a valve the circumferential surface of a socket, in the form of a ring or pot, integrally molded onto the housing part executing the pumping strokes. The other end of the bellows is provided with an end wall section which has at least one passage opening and covers like a valve one or more outlet openings of a housing end wall of the second housing part or forms the valve seat for a valve closing member which is molded onto a displacement body arranged in the bellows.

U.S. Pat. No. 5,058,778 to Jack Weinstein, describes squeeze bottle pumpless nozzle dispenser has a first lid, a second lid, a dispensing nozzle, a shut-off valve and a dip tube. The first lid, located on the top, has a dispensing orifice upper portion and a venting orifice upper portion. Each of these is located in either a track or a track follower formed in the bottom of the first lid and in alignment therewith. It has means for rotatable attachment to the second lid. The second lid has means for attaching to the squeeze bottle and includes the lower portions of a dispensing orifice and a venting orifice. Each of these is located in either a track or track follower and is located on the top of the second lid in alignment with the counterparts located on the bottom of the first lid. A shut-off valve is located within the lower or upper portion of the venting orifice, responsive to pressure. When the bottle is squeezed, the shut-off valve will close the vent so that fluid material will only exit through the dispensing orifice and thus through the nozzle. The first lid may be placed in a first position where neither the upper portion of the dispensing orifice nor the upper portion of the venting orifice is in alignment with its lower portion. When the first lid is rotated to a second position, there is simultaneous alignment of the upper and lower portions of both the dispensing orifice and the venting orifice.

U.S. Pat. No. 5,110,051 to Robert A. Bennett, describes a squeeze sprayer device is attached to a squeezable container of fluid. The device includes a capped cylinder containing an axially moveable discharge valve in the form of an air piston which unseats in response to air pressure to open the discharge upon squeezing the container for producing a fine mist spray as pressurized air admixes with the liquid at the discharge orifice. A one-way valve controlled air vent on the piston closes during the spray operation. Upon release of squeeze pressure, the piston returns, its one-way valve opens for venting, and the piston seal cuts off the spray.

U.S. Pat. No. 5,127,553 to Jack Weinstein, describes the present invention is a liquid metered dispensing container of the squeezable type. The squeezable container has an opening for dispensing liquid therefrom at one end and a bottom at the other end. A non-flexible trap chamber is connected to the opening and extends outwardly therefrom. The trap chamber has a lower end inserted into the container opening and has an inlet orifice extending from the lower end into the container. The inlet orifice is adapted to receive a dip tube which is attached thereto and extends close to or at the bottom of the container. The trap chamber has an upper end with a dispensing orifice. This is small enough to prevent dripping of liquid therefrom by gravity when the bottle is inverted but is large enough to dispense liquid therefrom when the bottle itself is squeezed. A one way valve is connected to the lower end of the trap chamber which permits liquid to flow from the container to the trap chamber but not vice versa. The trap chamber may have indicia so that exact dosage levels of different amounts may be squeezed into the chamber, or the chamber itself may have a single, predetermined volume.

U.S. Pat. No. 5,330,081 to Robert A. Davenport, describes a portion measuring device of the type having a first, flexible, reservoir having an inlet, and a second, portion measuring, reservoir in fluid communication with said first reservoir. The first, flexible, reservoir is of a larger volume than that heretofore known, and may have a handle to aid in holding. The second, portion measuring, reservoir has a rotatable closure with a pouring spout or opening therein. A configured periphery is provided on the closure to aid in turning the same.

U.S. Pat. No. 5,588,563 to Chin-Ching Liu, describes a quantitative dispenser including a cylindrical body with a bottom. A separator plate is engaged in an inner annular slot on the top of the cylindrical body. The separator plate has a central engaging hole and a flow-through opening. A cover is engaged over the outer periphery of said body. The cover has an outlet with a sealing cap and engages the separator plate. A scale divider has a sleeve part and a wing part. The sleeve part is slipped on a hollow engaging shaft and the wing part is able to be fixed as a way to form a measuring scale on the inner periphery of the cover. A scale is provided on an outer surface of said cover. The powdered mile stored in the body can pass through the flow-through opening on the periphery of the separator plate into a measuring space. The powder is then dispensed through an outlet in the cover.

Notwithstanding the prior art, the present invention is neither taught nor rendered obvious thereby.

SUMMARY OF THE INVENTION

The present invention is directed to a metered liquid squeezable dispenser, which comprises a squeezable container having an open end and neck for dispensing liquid. A trap chamber base for a rotatable attachment of a trap chamber thereto is provided. The base is adapted to fit and lock onto the neck of the squeezable container, and has a dip tube located thereon and extending downwardly from a dip tube orifice on the bottom of the dip tube base. The dip tube base also has an air inlet orifice located thereon. The trap chamber is rotatably connected to the trap chamber base, with the trap chamber having sidewalls, a bottom, a top, and a dispensing outlet. The trap chamber has at least one metered dosage inlet pipe passing through the bottom of the trap chamber, extending upwardly therefrom for a predetermined height, and has a separate air pipe passing through the bottom of the trap chamber, extending upwardly therefrom, for a height at least equal to the height of the metered dosage inlet pipe. There is a first position in which the dispensing outlet of the trap chamber and the air inlet orifice of the trap chamber base are adapted to be closed when a metered dosage inlet pipe of the trap chamber and the dip tube of the trap chamber base are in alignment with one another. Therefore, a metered dosage inlet pipe is open to the dip tube when the air inlet orifice of the trap chamber base and the air pipe of the trap chamber are not aligned with one another. In this first position, the container is squeezed for movement of liquid from the container to the trap chamber and return of excess liquid from the trap chamber back into the container via the metered dosage inlet pipe and dip tube via gravity flow. A diaphragm accommodates volume expansion due to addition of liquid and airspace air.

There is a second position wherein all metered dosage inlet pipes of the trap chamber and the dip tube of the trap chamber base are not in alignment with one another. In this second position, the air pipe of the trap chamber and the air inlet orifice of the trap chamber base are in alignment with one another. Further, in this second position, the dispensing outlet of the trap chamber is open for metered dispensing by squeezing.

BRIEF DESCRIPTION OF THE DRAWINGS

The present invention should be more fully understood when the specification herein is taken in conjunction with the drawings appended hereto wherein.

DETAILED DESCRIPTION OF THE PRESENT INVENTION

The present invention metered liquid squeezable device is described in the Summary above, it may be formed of plastic components or a combination of materials and the container may be in the form of a cylindrical bottle as shown in the Figures below or in some other shape or mode as long as it is squeezable and resilient and has an open end for attachment of the trap chamber base thereto.

Additionally, while the drawings show metered dosage arrangements with external, side wall indicia, these could be visually, e.g. by using clear plastic components. Further, in the case of a single metered dosage arrangement, simple fill and dispense positions could be utilized. Alternatively, see through positional internal indicia could be used. Finally, the device could be made by a manufacturer without any indicia at all and then be sold to a filler, product maker who could put labelling on the components which could include printed indicia.

Figure 1:
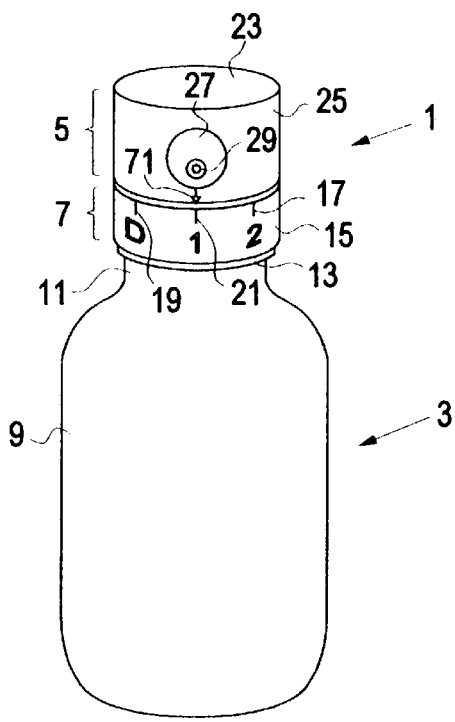
FIG. 1 shows a front view of a present invention metered liquid squeezable dispenser for multiple dose selection.

Referring now to FIG. 1, there is shown a present invention dispenser 1 which includes a bottle container 3, a trap chamber 5 and a trap chamber base 7. Container 3 has side walls 9 which taper into neck 11 with a collar 13. Above collar 13 would be an extended piece (not shown) with means for attaching trap chamber base 7 thereto and for preventing significant rotation of trap chamber base 7.

Figure 2:
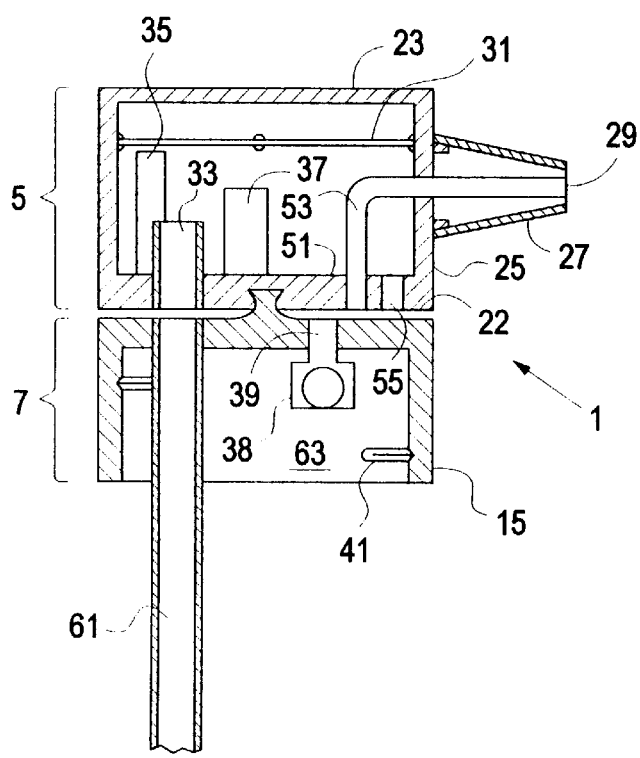
FIG. 2 shows a partial cut side view of the trap chamber base and trap chamber of FIG. 1.

Referring to FIGS. 1, 2, 3 and 4 collectively, with like parts identically numbered, trap chamber base 7 has a side wall 15 and indicia 17, 19 and 21. It also contains an air inlet orifice 39 and a dip tube 61 extending therethrough, as shown especially in FIG. 2. Trap chamber base 7 has an open area 63 for fitting onto bottle container 3 and has internal locks such as short track 41 on its inside wall which would snap and lock onto protrusions on the upper wall of container 3 (not shown). This may be permanent locking or temporary or removable locking. Trap chamber 5 has an air pipe 35 and a one cc metered dosage inlet pipe 33 and a two cc metered dosage inlet pipe 37. These could be other dosage amounts and could involve more than two such metered dosage inlet pipes. It also has a diaphragm 31, a sidewall 25, a top 23 and a bottom 22. There is also a dispensing outlet 29 with housing 27 protruding outwardly from trap chamber 5. In some embodiments, the dispensing outlet housing may be a snap-on or screw-on component or otherwise fittably removable to permit cleaning. Dispensing outlet 29 has a pipe 53 extending through bottom 22 and another vertical pipe 55 which will cooperate with pipe 53 when in a different position to permit dispensing. Pipe 53 and vertical pipe 55 act together with another component described above to create a shut-off valve arrangement and FIG. 2 is in the shut-off position. Note that diaphragm 31 may be the upper portion of the top chamber itself, i.e. a flexible top.

Figure 3:
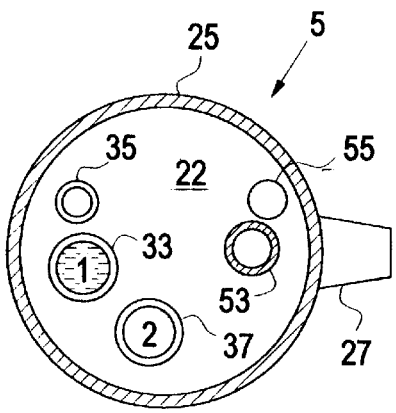
FIGS. 3 and 4 show top views of the trap chamber and trap chamber base respectively which are shown in FIGS. 1 and 2.
Figure 4:
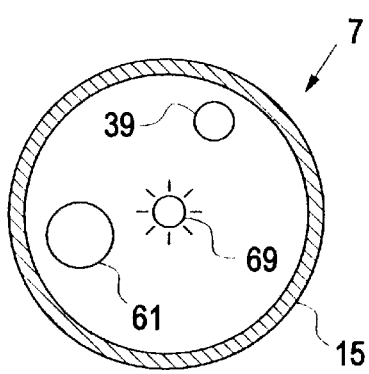

FIG. 3 specifically shows a one cc metered dosage inlet pipe 33 because it is in alignment with dip tube 61 shown in FIGS. 2 and 4. In FIG. 4 protrusion 69 has a wide end top for insertion into a receiving orifice on the underside of bottom 51 of trap chamber 5. This permits rotatable connection of trap chamber 5 to trap chamber base 7.

Figure 5:
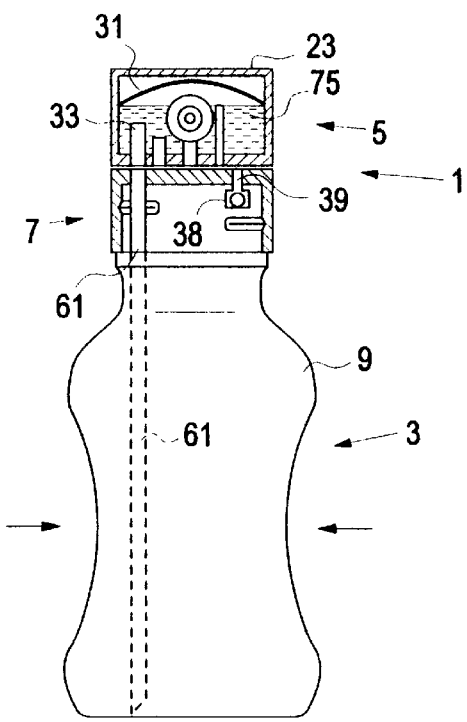
FIGS. 5 and 6 show front, partially cut views of the present invention FIG. 1 device being filled to a metered dosage.

Referring now to FIG. 5 with identical parts identically numbered, bottle container 3 is squeezed as shown by the arrows and, because air inlet orifice 39 is closed off, liquid contained in bottle container 3 is forced upwardly into trap chamber 5 via dip tube 61 and this is shown as liquid 75 in FIG. 5. Because trap chamber 5 is otherwise closed off except at the one cc metered dosage inlet pipe 33 and liquid is being forced up the one cc metered dosage inlet pipe 33, air trapped in trap chamber 5 would resist liquid movements or have to be compressed. Therefore diaphragm 31 is included to accommodate necessary volumetric expansion and air outlet 22 permits air above diaphragm 31 to enter and exit in the space above. In some preferred embodiments, the air inlet pipe 33 may contain a gravity valve 38 which would close when the present invention device is inverted to avoid undesired movement of container material. Thus, liquid 75 displaces air and forces diaphragm 31 to expand as shown.

Figure 6:
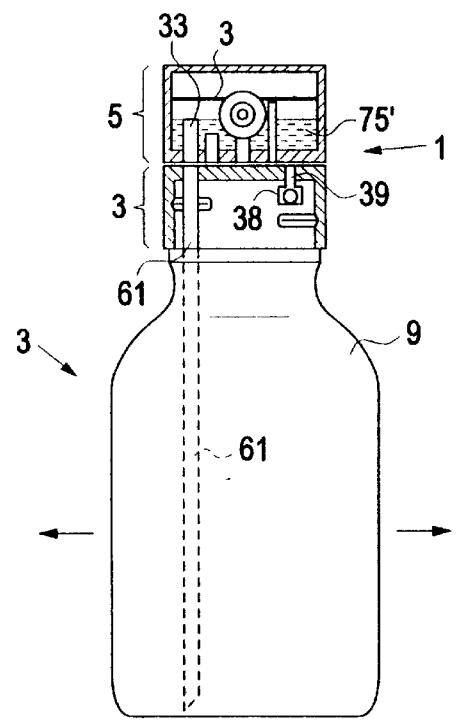

Referring now to FIG. 6, once a user releases from squeezing the container (arrows), the liquid will level down to the top of the one cc metered dosage inlet pipe 33 and excess above that level will return via dip tube 61 and diaphragm 31 will return to recover to its rest position. The remaining liquid is shown as liquid 75' in FIG. 6.

Figure 7:
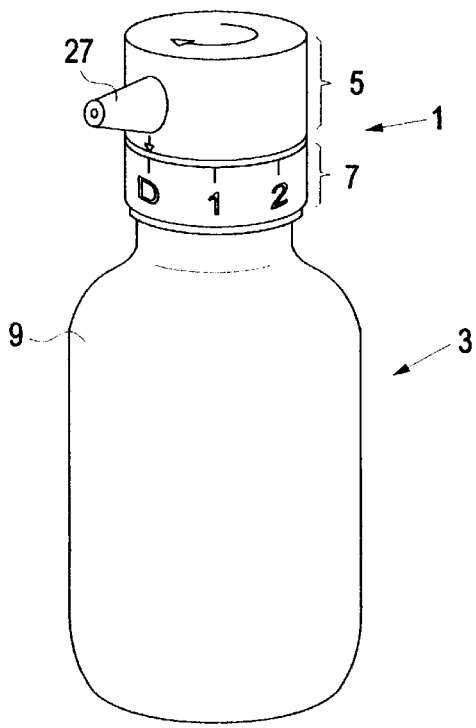
FIG. 7 shows a front view of the present invention device shown in FIG. 1, but being rotated for dispensing after filling
Figure 8:
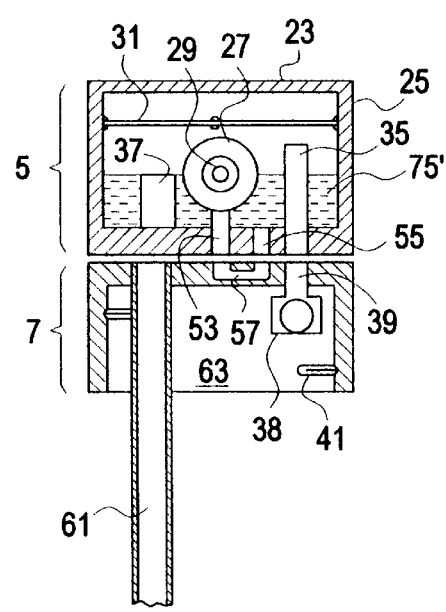
FIG. 8 shows a partial front cut view thereof.
Figure 9:
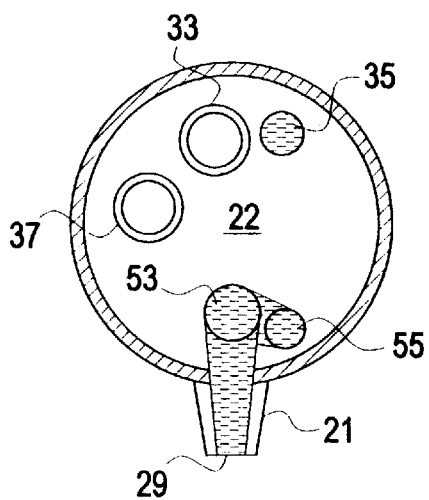
FIG. 9 shows a top cut view of the trap chamber in the position shown in FIG. 8.

Next, a user will rotate trap chamber 5 to the dispensing position (indicia 21 of FIG. 1) as shown by the arrow in FIG. 7. FIG. 8 shows a front cut view of the upper aspects of is FIG. 7 and now shows air inlet orifice 39 in alignment with air pipe 35 and also shows pipe 53 and another vertical pipe 55 in alignment with truncated "U" shaped orifice 57. FIG. 9 shows a top view of this relationship with the shaded areas represents aligned flow path shown also in FIG. 8 between trap chamber 5 and trap chamber base 7.

Figure 10:
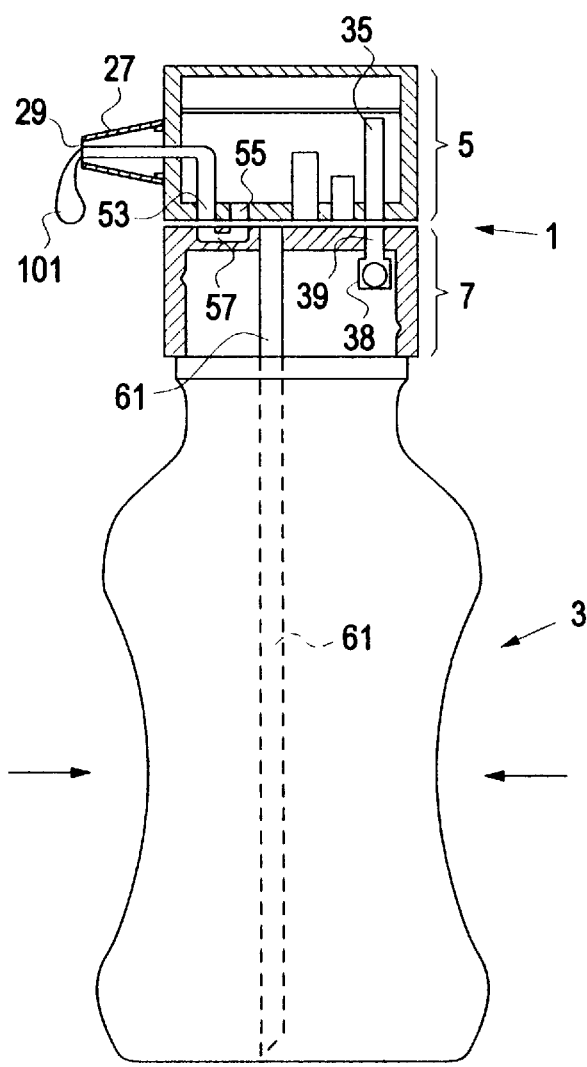
FIG. 10 shows the present invention device of FIG. 1 in the dispensing mode; and, FIG. 11 shows a top cut view of a trap chamber in a different dosage filling position from that shown in FIG. 3.

FIG. 10 shows a side partially cut view illustrating dispensing. When container 3 is squeezed at the arrows, air goes through air inlet orifice 39 and air pipe 35 and liquid is forced by the air pressure through air inlet orifice 39, up air pipe 35 and the air pressure forces a liquid material through vertical pipe 55, truncated "U" shaped orifice 57 and pipe 53 and out dispensing outlet 29. Thus, the dispensed materials is shown in part as liquid drop 101. When all of the liquid is dispensed, air from outside the container returns to equalize pressure.

Figure 11:
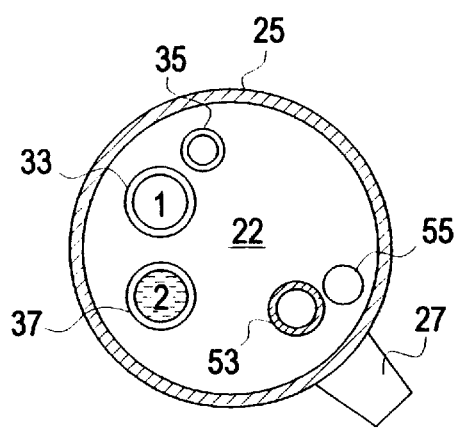

Going back to FIG. 3, if the alternate dosage (indicia 17 of FIG. 1) had been selected, alignment would be with two cc metered dosage inlet pipe 37 and this is illustrated in FIG. 11. There would be n number of metered dosage inlet pipes with corresponding alignment position to offer more than two dosage choices.

Obviously, numerous modifications and variations of the present invention are possible in light of the above teachings. It is therefore understood that within the scope of the appended claims, the invention may be practiced otherwise than as specifically described herein.

What is claimed is:

1. A metered liquid squeezable dispenser, which comprises:

(a) a squeezable container having an open end and neck for dispensing liquid therefrom;

(b) a trap chamber base for rotatable attachment of a trap chamber thereto, said base being adapted to fit and lock onto said neck of said squeezable container, said base having a dip tube orifice thereon and having a dip tube connected thereto and extending downwardly into said container, said base having an air inlet orifice located thereon;

(c) a trap chamber rotatably connected to said trap chamber base, said trap chamber having sidewalls, a bottom, a top and a dispensing outlet, said trap chamber having a closed dispensing outlet pipe running from said dispensing outlet to said trap chamber bottom and having a shut-off valve arrangement at said bottom, said trap chamber having at least one metered dosage inlet pipe passing through the bottom of said trap chamber and extending upwardly therefrom for a predetermined height, said trap chamber having an air pipe passing through its bottom and extending upwardly therefrom for a height at least equal to the height of said at least one metered dosage inlet pipe;

said dispensing outlet shut-off valve arrangement being adapted to be closed relative to said base when said at least one metered dosage inlet pipe of said trap chamber and said dip tube of said trap chamber base are in alignment with one another, and to be opened when said air inlet orifice of said trap chamber base and said air pipe of said trap chamber are aligned with one another;

wherein said trap chamber base and said trap chamber are rotatable relative to one another and have a first position wherein said at least one metered dosage inlet pipe of said trap chamber and said dip tube of said trap chamber base are in alignment with one another and said air pipe of said chamber and said air inlet orifice of said trap chamber base are not in alignment with one another and said dispensing outlet shut-off valve arrangement is closed, and have a second position wherein said metered dosage inlet pipe of said trap chamber and said dip tube of said trap chamber base are not in alignment with one another and said air pipe of said chamber and said air inlet orifice of said trap chamber base are in alignment with one another and said dispensing outlet shut-off valve arrangement is open.

2. The metered liquid squeezable dispenser of claim 1 wherein said dispensing outlet shut-off valve arrangement constitutes two non-horizontal orifices separated from one another and located in said bottom of said trap chamber, and a truncated "U" shaped opening in said trap chamber base, such that when said shut-off valve arrangement is closed, said two non-horizontal orifices of said trap chamber are not in alignment with said truncated "U" shaped opening in said trap chamber base.

3. The metered liquid squeezable dispenser of claim 1 wherein there are plurality of different metered dosage inlet pipes, each having different predetermined heights for different dosages, said plurality of metered dosage inlet pipes being n number of pipes, wherein said trap chamber base and said trap chamber have n number of positions wherein for each different metered dosage inlet pipe there is a different position in which it is in alignment with said dip tube of said trap chamber base and wherein said air inlet orifice of said trap chamber base are not in alignment with one another, and have an n+1th position wherein none of said plurality of metered dosage inlet pipes are in alignment with said dip tube, and wherein said air pipe of said trap chamber and said air inlet orifice of said trap chamber base are in alignment with one another.

4. The metered liquid squeezable dispenser of claim 3 wherein said dispensing outlet shut-off valve arrangement constitutes two non-horizontal orifices separated from one another and located in said bottom of said trap chamber, and a truncated "U" shaped opening in said trap chamber base, such that when said shut-off valve arrangement is closed, said two non-horizontal orifices of said trap chamber are not in alignment with said truncated "U" shaped opening in said trap chamber base.

5. The metered liquid squeezable dispenser of claim 3 wherein said air pipe has a height at least equal to the height of the tallest of said nth number of metered dosage inlet pipes.

6. The metered liquid squeezable dispenser of claim 1 wherein said trap chamber base and said neck of said container include locking means to prevent both upward removal of said trap chamber base from said neck of said container and prevent rotation of said trap chamber base about said neck.

7. The metered liquid squeezable dispenser of claim 1 wherein said dispensing outlet of said chamber includes a protruded housing which extends outwardly from said trap chamber.

8. The metered liquid squeezable dispenser of claim 1 wherein said trap chamber includes a diaphragm located inside and above said air pipe and below said top of said trap chamber to accommodate volumetric expansion during use of said dispenser, and at least one air inlet-outlet orifice on said trap chamber and above said diaphragm.

9. The metered liquid squeezable dispenser of claim 1 wherein said trap chamber and said trap chamber base are connected to one another for rotation by a central pin and catch arrangement.

10. The metered liquid squeezable dispenser of claim 1 wherein said trap chamber and said trap chamber base are connected to one another for rotation by an interlocking peripheral track and rail arrangement.

11. A metered liquid squeezable dispenser, which comprises:

(a) a squeezable container having an open end and neck for dispensing liquid therefrom;

(b) a trap chamber base for rotatable attachment of a trap chamber thereto, said base being adapted to fit and lock onto said neck of said squeezable container, said base having a dip tube orifice thereon and having a dip tube connected thereto and extending downwardly into said container, said base having an air inlet orifice located thereon;

(c) a trap chamber rotatably connected to said trap chamber base, said trap chamber having sidewalls, a bottom, a top and a dispensing outlet, said trap chamber having a closed dispensing outlet pipe running from said dispensing outlet to said trap chamber bottom and having a shut-off valve arrangement at said bottom, said trap chamber having at least one metered dosage inlet pipe passing through the bottom of said trap chamber and extending upwardly therefrom for a predetermined height, said trap chamber having an air pipe passing through its bottom and extending upwardly therefrom for a height at least equal to the height of said at least one metered dosage inlet pipe;

(d) indicia located on said trap chamber and said trap chamber base for selective alignment for filling and subsequent dispensing of said dispenser;

said dispensing outlet shut-off valve arrangement being adapted to be closed relative to said base when said at least one metered dosage inlet pipe of said trap chamber and said dip tube of said trap chamber base are in alignment with one another, and to be opened when said air inlet orifice of said trap chamber base and said air pipe of said trap chamber are aligned with one another;

wherein said trap chamber base and said trap chamber are rotatable relative to one another and have a first position wherein said at least one metered dosage inlet pipe of said trap chamber and said dip tube of said trap chamber base are in alignment with one another and said air pipe of said chamber and said air inlet orifice of said trap chamber base are not in alignment with one another and said dispensing outlet shut-off valve arrangement is closed, and have a second position wherein said metered dosage inlet pipe of said trap chamber and said dip tube of said trap chamber base are not in alignment with one another and said air pipe of said chamber and said air inlet orifice of said trap chamber base are in alignment with one another and said dispensing outlet shut-off valve arrangement is open.

12. The metered liquid squeezable dispenser of claim 11 wherein said dispensing outlet shut-off valve arrangement constitutes two non-horizontal orifices separated from one another and located in said bottom of said trap chamber, and a truncated "U" shaped opening in said trap chamber base, such that when said shut-off valve arrangement is closed, said two non-horizontal orifices of said trap chamber are not in alignment with said truncated "U" shaped opening in said trap chamber base.

13. The metered liquid squeezable dispenser of claim 11 wherein there are plurality of different metered dosage inlet pipes, each having different predetermined heights for different dosages, said plurality of metered dosage inlet pipes being n number of pipes, wherein said trap chamber base and said trap chamber have n number of positions wherein for each different metered dosage inlet pipe there is a different position in which it is in alignment with said dip tube of said trap chamber base and wherein said air inlet orifice of said trap chamber base are not in alignment with one another, and have an n+1th position wherein none of said plurality of metered dosage inlet pipes are in alignment with said dip tube, and wherein said air pipe of said trap chamber and said air inlet orifice of said trap chamber base are in alignment with one another.

14. The metered liquid squeezable dispenser of claim 13 wherein said dispensing outlet shut-off valve arrangement constitutes two non-horizontal orifices separated from one another and located in said bottom of said trap chamber, and a truncated "U" shaped opening in said trap chamber base, such that when said shut-off valve arrangement is closed, said two non-horizontal orifices of said trap chamber are not in alignment with said truncated "U" shaped opening in said trap chamber base.

15. The metered liquid squeezable dispenser of claim 13 wherein said air pipe has a height at least equal to the height of the tallest of said nth number of metered dosage inlet pipes.

16. The metered liquid squeezable dispenser of claim 11 wherein said trap chamber base and said neck of said container include locking means to prevent both upward removal of said trap chamber base from said neck of said container and prevent rotation of said trap chamber base about said neck.

17. The metered liquid squeezable dispenser of claim 11 wherein said dispensing outlet of said chamber includes a protruded housing which extends outwardly from said trap chamber.

18. The metered liquid squeezable dispenser of claim 11 wherein said trap chamber includes a diaphragm located inside and above said air pipe and below said top of said trap chamber to accommodate volumetric expansion during use of said dispenser, and at least one air inlet-outlet orifice on said trap chamber and above said diaphragm.

19. The metered liquid squeezable dispenser of claim 11 wherein said trap chamber and said trap chamber base are connected to one another for rotation by a central pin and catch arrangement.

20. The metered liquid squeezable dispenser of claim 11 wherein said trap chamber and said trap chamber base are connected to one another for rotation by an interlocking peripheral track and rail arrangement.

* * * * *